(12) United States Patent
Sho et al.

(10) Patent No.: US 11,008,057 B2
(45) Date of Patent: May 18, 2021

(54) TRACK LINK AND LINK MOUNTED PART

(71) Applicant: KOMATSU LTD., Tokyo (JP)

(72) Inventors: Tomoyoshi Sho, Kyotanabe (JP); Kenichi Hisamatsu, Hirakata (JP); Hisao Asada, Kyotanabe (JP)

(73) Assignee: KOMATSU LTD., Tokyo (JP)

( * ) Notice: Subject to any disclaimer, the term of this patent is extended or adjusted under 35 U.S.C. 154(b) by 520 days.

(21) Appl. No.: 15/748,322

(22) PCT Filed: Oct. 22, 2015

(86) PCT No.: PCT/JP2015/079852
§ 371 (c)(1),
(2) Date: Jan. 29, 2018

(87) PCT Pub. No.: WO2017/068687
PCT Pub. Date: Apr. 27, 2017

(65) Prior Publication Data
US 2018/0215427 A1 Aug. 2, 2018

(51) Int. Cl.
| | |
|---|---|
| *B62D 55/21* | (2006.01) |
| *B62D 55/20* | (2006.01) |
| *B62D 55/32* | (2006.01) |
| *E02F 9/02* | (2006.01) |

(52) U.S. Cl.
CPC .......... *B62D 55/202* (2013.01); *B62D 55/21* (2013.01); *B62D 55/32* (2013.01); *E02F 9/02* (2013.01)

(58) Field of Classification Search
CPC ...... B62D 55/20; B62D 55/28; B62D 55/202; B62D 55/21; B62D 55/32; E02F 9/02
See application file for complete search history.

(56) References Cited

U.S. PATENT DOCUMENTS

| | | | | |
|---|---|---|---|---|
| 1,789,814 | A * | 1/1931 | George | B62D 55/20 305/198 |
| 2,530,379 | A | 11/1950 | Davidson | |
| 4,093,319 | A * | 6/1978 | Borner | B62D 55/27 305/189 |
| 4,139,240 | A * | 2/1979 | Profio | B62D 55/062 29/891.1 |
| 4,765,694 | A * | 8/1988 | Cory | B62D 55/211 305/164 |
| 2004/0150263 | A1* | 8/2004 | Katoh | B62D 55/244 305/171 |
| 2011/0221266 | A1* | 9/2011 | Bonnetain | B62D 55/21 305/202 |

(Continued)

FOREIGN PATENT DOCUMENTS

| | | | |
|---|---|---|---|
| JP | 06-156331 A | 6/1994 | |
| JP | 2002-46666 A | 2/2002 | |
| JP | 2002046666 A * | 2/2002 | ............. B62D 55/27 |

*Primary Examiner* — Scott A Browne
(74) *Attorney, Agent, or Firm* — Faegre Drinker Riddle & Reath LLP (57) ABSTRACT

A link mounted part is formed as a part separate from a link body. The link mounted part includes a plate portion having a rail surface, and two projection portions which are integrally formed with the plate portion and project upward from the rail surface. A mounting pin mounts the link mounted part on the link body below the plate portion on a side opposite to the projection portions with respect to the plate portion.

9 Claims, 6 Drawing Sheets

(56) References Cited

U.S. PATENT DOCUMENTS

2011/0316330 A1* 12/2011 Doyle .................. B62D 55/244
  305/165
2012/0086265 A1* 4/2012 Simula .................. B62D 55/28
  305/106

* cited by examiner

TRACK LINK AND LINK MOUNTED PART

TECHNICAL FIELD

The present invention relates to a track link and a link mounted part.

BACKGROUND ART

A track-type work vehicle such as a hydraulic excavator includes a traveling unit, a revolving unit, and a work implement mounted on the revolving unit. The traveling unit includes drive wheels (sprockets), idler wheels (idler tumblers), rollers, track apparatuses, and the like.

The track apparatus is mounted on and wound around the idler wheel and the drive wheel. By making teeth of the drive wheel mesh with the track apparatus and by rotating the drive wheel, the track apparatus is rotatably driven. In general, the track apparatus is configured such that a plurality of track links are connected in an endless shape (annular shape) by pins and bushings, and track shoe plates (shoes) are mounted on the plurality of track links.

With respect to a traveling unit of a large-sized vehicle, there has been known a track apparatus where a track shoe plate and a link are integrally formed with each other. The track apparatus of this type is disclosed in U.S. Pat. No. 2,530,379 (see PTD 1), for example.

In this publication, a track link includes a wheel receiving path, and upright flanges positioned on both sides of the wheel receiving path. The wheel receiving path is a portion which forms a rail surface on which the rollers pass. The upright flanges are portions which mesh with a drive tumbler which forms the drive wheel.

An endless belt is formed by connecting the above-mentioned plurality of track links in an endless manner. By rotating the drive tumbler in a state where the upright flanges of the track links mesh with the drive tumbler, the above-mentioned endless belt is rotatably driven.

CITATION LIST

Patent Document

PTD 1: U.S. Pat. No. 2,530,379

SUMMARY OF INVENTION

Technical Problem

In the above-mentioned track link, portions which exhibit a large degree of abrasion are the wheel receiving path (rail surface) and the upright flanges which mesh with the drive tumbler. When the abrasion of the wheel receiving path or the upright flange becomes conspicuous, it is necessary to perform a maintenance work. This maintenance work is performed in such a manner that joints of the track links are released and, thereafter, build-up welding is applied to an abraded portion (the wheel receiving path or the upright flange) or the entire track link is exchanged with a new track link.

However, in the above-mentioned methods, it is necessary to release joints of the track links and hence, steps of the maintenance work is large whereby time and efforts necessary for the work become large.

The present invention has been made in view of the above-mentioned drawbacks, and it is an object of the present invention to provide a track link and a link mounted part which enable maintenance of an abraded portion without releasing joints of track links.

Solution to Problem

A track link according to the present invention includes a link body, a link mounted part, and a mounting pin. The link body is an integral body formed of a track shoe plate portion and a link portion. The link mounted part is formed as a part separate from the link body, and includes a plate portion having a rail surface, and a projection which is integrally formed with the plate portion and projects from the rail surface. The mounting member mounts the link mounted part on the link body on a side opposite to the projection with respect to the plate portion.

In the track link according to the present invention, the link mounted part is mounted on the link body by the mounting member. By removing the mounting member from the link mounted part and the link body, link mounted part can be removed from the link body. Accordingly, even when the projection or the rail surface of the link mounted part is abraded, it is possible to perform maintenance of an abraded portion by removing the link mounted part from the link body without releasing joints of the track links.

In the above-mentioned track link, the mounting member is a mounting pin. With such a configuration, the mounting member can have the simple configuration.

In the above-mentioned track link, the projection includes a first projection portion and a second projection portion. Each of the first projection portion and the second projection portion is integrally formed with the plate portion, and projects from the rail surface. The first projection portion and the second projection portion are arranged on both sides of the plate portion with the plate portion sandwiched therebetween.

With such a configuration, it is possible to make both of the first and second projection portions which sandwich the rail surface therebetween mesh with the drive wheel. Accordingly, it is possible to realize stable meshing between the first and second projection portions and the drive wheel.

In the above-mentioned track link, the link mounted part is brought into contact with the link body.

With such a configuration, an external force which acts on the link mounted part during driving of the track link acts on the link body and does not act on the mounting pin. A load which acts on the mounting pin can be reduced in this manner and hence, durability of the track link can be enhanced.

In the above-mentioned track link, a first pin insertion hole is formed in the link mounted part, and a second pin insertion hole is formed in the link body. The mounting pin is inserted into both of the first pin insertion hole and the second pin insertion hole.

By inserting the mounting pin into both of the first pin insertion hole formed in the link mounted part and the second pin insertion hole formed in the link body, the link mounted part can be detachably mounted on the link body.

In the above-mentioned track link, the second pin insertion hole has a first hole portion positioned on one end portion side and a second hole portion positioned on the other end portion side. The first hole portion has a diameter larger than or equal to a diameter of the mounting pin, and the second hole portion has a diameter smaller than the diameter of the mounting pin.

With such a configuration, the mounting pin can be inserted into the inside of the second pin insertion hole from a first hole portion side. Further, in inserting the mounting pin into the inside of the second pin insertion hole, the insertion of the mounting pin can be stopped at a boundary between the first hole portion and the second hole portion. Accordingly, positioning of the mounting pin at the time of inserting the mounting pin can be performed easily.

In the above-mentioned track link, an end surface of the mounting pin is exposed from the link body through the second hole portion.

With such a configuration, by pushing the end surface of the mounting pin exposed through the second hole portion, the mounting pin can be removed from the first and second hole portions.

The above-mentioned track link further includes a restriction member which is mounted on the link body and restricts the movement of the mounting pin in an axial direction of the mounting pin.

With the provision of such a restriction member, the movement of the mounting pin inserted into the first and second pin insertion holes in the axial direction is restricted. Accordingly, the removal of the mounting pin from the first and second pin insertion holes can be prevented by the restriction member.

The link mounted part according to the present invention includes a plate portion, a projection, and a mount element. The plate portion has a rail surface. The projection is integrally formed with the plate portion and projects from the rail surface. The mount element is mounted on the plate portion, extends toward a side opposite to the projection with respect to the plate portion, and has a mounting member hole.

In the link mounted part according to the present invention, the link mounted part has a mount element having the mounting member hole. Accordingly, by inserting the mounting member into the mounting member hole formed in the mount element, the link mounted part can be detachably mounted on the link body. Accordingly, even when the projection or the rail surface of the link mounted part is abraded, maintenance of the abraded portion can be performed by removing the link mounted part from the link body without releasing joints of the track links.

In the above-mentioned link mounted part, the mounting member hole is a pin insertion hole. By using the mounting pin as the mounting member in this manner, the configuration of the mounting member per se can be simplified and, at the same time, the configuration of the mounting member hole can be also simplified.

In the above-mentioned link mounted part, the projection includes a first projection portion and a second projection portion. The first projection portion and the second projection portion are respectively integrally formed with the plate portion, and respectively project from the rail surface. The first projection portion and the second projection portion are arranged on both sides of the plate portion with the plate portion sandwiched therebetween.

With such a configuration, it is possible to make both of the first and second projection portions which sandwich the rail surface therebetween mesh with the drive wheel. Accordingly, it is possible to realize stable meshing between the first and second projection portions and the drive wheel.

Advantageous Effects of Invention

As has been described heretofore, according to the present invention, it is possible to realize the track link and the link mounted part which enable maintenance of an abraded portion without releasing joints of the track links.

BRIEF DESCRIPTION OF DRAWINGS

FIGS. 4(A) to 4(D) are views showing a configuration of a link mounted part included in the track apparatus in FIG. 3, wherein

FIGS. 5(A) to 5(D) are views showing a configuration of a link body included in the track apparatus in FIG. 3, wherein

FIGS. 6(A) and 6(B) are views showing a configuration of the link body included in the track apparatus in FIG. 3, wherein

DESCRIPTION OF EMBODIMENTS

Hereinafter, an embodiment of the present invention is described with reference to drawings.

First, a configuration of a work vehicle according to one embodiment of the present invention is descried.

Hereinafter, with reference to FIG. 1, a hydraulic excavator is described as one example of a work vehicle to which the concept of the present invention is applicable. The present invention is also applicable to a track-type work vehicle such as a crawler dozer besides a hydraulic excavator.

In this embodiment, the positional relationship of respective parts is described with reference to an operator sitting on an operation seat in the inside of an operator's cab 31. Fore/aft directions are frontward and rearward directions with respect to the operator sitting on the operation seat. Leftward and rightward directions (lateral direction) are leftward and rightward directions with respect to the operator sitting on the operation seat. Upward and downward directions are upward and downward directions with respect to the operator sitting in the operation seat.

A direction which opposedly faces the operator sitting on the operation seat from a front side is a frontward direction, and a direction opposite to the frontward direction is a rearward direction. A direction toward a right side and a direction toward a left side when the operator sitting on the operation seat opposedly faces a front side are a rightward direction and a leftward direction respectively. A foot side of the operator sitting on the operation seat is a lower side, and an overhead side of the operator sitting on the operation seat is an upper side.

Figure 1:
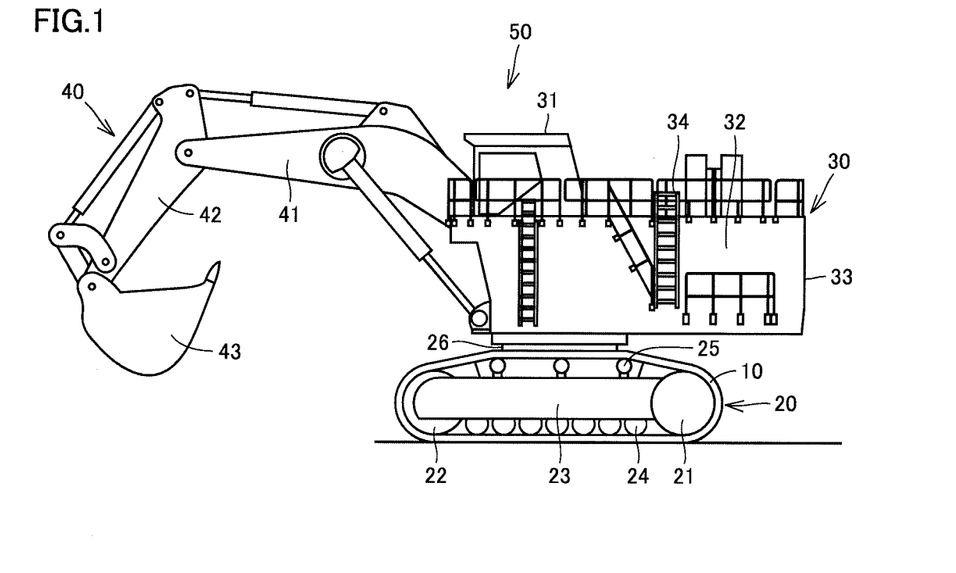
FIG. 1 is a schematic side view showing a configuration of a hydraulic excavator as an example of a track-type work vehicle using a track apparatus according to one embodiment of the present invention.

FIG. 1 is a schematic side view showing a configuration of a hydraulic excavator as an example of a track-type work vehicle using a track apparatus according to one embodiment of the present invention. As shown in FIG. 1, a hydraulic excavator 50 of this embodiment is a large-sized hydraulic excavator, and mainly includes a traveling unit 20, a revolving unit 30, and a work implement 40. A work vehicle body is formed of traveling unit 20 and revolving unit 30.

Revolving unit 30 is mounted on traveling unit 20 in a turnable manner. Revolving unit 30 mainly includes an operator's cab 31, an engine compartment 32, a counter weight 33, and an access system 34.

Operator's cab 31 is disposed on left side of a front portion (a front side in a longitudinal direction of a vehicle) of revolving unit 30, for example. Engine compartment 32 and counter weight 33 are respectively disposed on a rear side (a rear side in the longitudinal direction of the vehicle) of revolving unit 30. Engine compartment 32 houses an engine unit (an engine, an exhaust gas processing structural body and the like) therein. An upper portion of engine compartment 32 is covered by an engine hood. Counter weight 33 is disposed behind engine compartment 32.

Access system 34 is disposed on a side portion of revolving unit 30, for example, on a left side of revolving unit 30. Access system 34 is provided for allowing an operator to get in operator's cab 31 from a ground or to get off from operator's cab 31 to the ground.

Work implement 40 is pivotally supported on a front side of revolving unit 30. Work implement 40 includes a boom 41, a dipper stick 42, a bucket 43, hydraulic cylinders and the like, for example. A proximal end portion of boom 41 is connected to revolving unit 30 in a rotatable manner. A proximal end portion of dipper stick 42 is connected to a distal end portion of boom 41 in a rotatable manner. Bucket 43 is connected to a distal end portion of dipper stick 42 in a rotatable manner. Work implement 40 can be actuated by driving boom 41, dipper stick 42, and bucket 43 respectively using hydraulic cylinders.

Traveling unit 20 is configured such that work vehicle (hydraulic excavator) 1 travels by rotating and driving a pair of right and left track apparatuses 10. Traveling unit 20 mainly includes track apparatuses 10, drive wheels (sprockets) 21, idler wheels (idlers) 22, a track frame 23, track rollers 24, carrier rollers 25, and a revolving apparatus 26.

Driving wheel 21 is mounted on a rear end portion of track frame 23 in a rotatable and drivable manner. Idler wheel 22 is mounted on a front end portion of track frame 23 in a rotatable manner. A plurality of track rollers 24 are mounted on a lower side of track frame 23. A plurality of carrier rollers 25 are mounted on an upper side of track frame 23.

Track apparatus 10 is wound around and between drive wheel 21 and idler wheel 22. Track apparatus 10 is supported by track rollers 24 and carrier rollers 25 which are disposed between drive wheel 21 and idler wheel 22. Track apparatus 10 is meshed with drive wheel 21. When drive wheel 21 is rotatably driven in such a state, track apparatus 10 is rotatably driven. With such a configuration, traveling unit 20 travels in a self-propelled manner. When track apparatus 10 is rotatably driven, idler wheel 22, a plurality of track rollers 24 and a plurality of carrier rollers 25 are respectively brought into contact with track apparatus 10 and are rotatable along with track apparatus 10.

Figure 2:
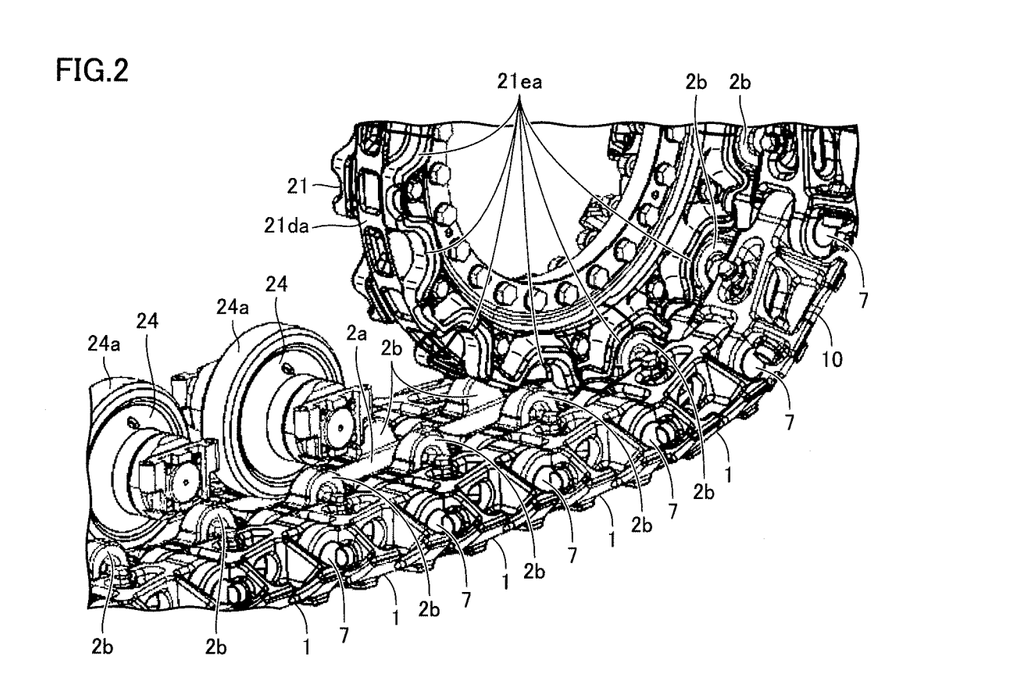
FIG. 2 is a perspective view schematically showing a part of a configuration of a traveling unit of the track-type work vehicle in FIG. 1.

FIG. 2 is a perspective view schematically showing a part of a configuration of the traveling unit of the track-type work vehicle in FIG. 1. As shown in FIG. 2, track apparatus 10 is configured such that a plurality of track links 1 are connected to each other in an endless manner (annularly) by connecting pins 7.

Each of the plurality of track links 1 includes a rail surface 2a, and two projection portions (projections) 2b. Two projection portions (projections) 2b are disposed on both sides of a plate portion while sandwiching the plate portion having rail surface 2a therebetween. Rail surface 2a and two projection portions 2b are disposed on an inner surface (non ground-engaging surface) of track apparatus 10 which is formed by connecting track links 1 in an endless manner.

Rail surface 2a is a surface on which drive wheel 21, roller wheels (for example, track rollers 24) and the like roll. When track apparatus 10 is rotatably driven, a rolling surface 21da of drive wheel 21, rolling surfaces 24a of rollers (for example, track rollers 24) and the like are brought into contact with rail surface 2a.

Two respective projection portions 2b are portions which are meshed with recessed portions 21ea formed on an outer periphery of drive wheel 21. Due to meshing of projection portions 2b and recessed portions 21ea, a rotational driving force of drive wheel 21 is transmitted to track apparatus 10 so that track apparatus 10 is rotatably driven.

Figure 3:
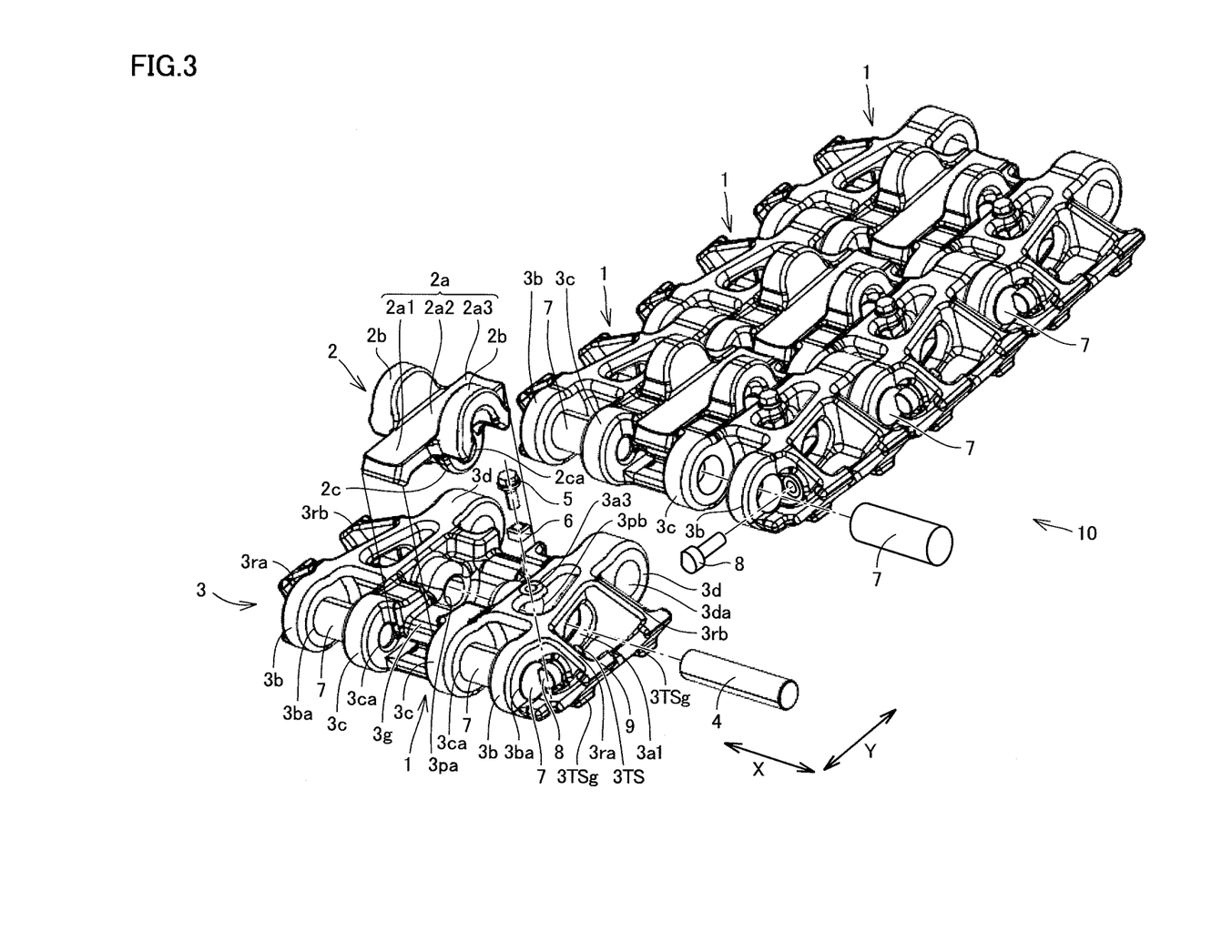
FIG. 3 is an exploded perspective view schematically showing a part of a configuration of the track apparatus included in traveling unit in FIG. 2.

Next, with reference to FIG. 3, a configuration of track apparatus 10 of this embodiment is described.

FIG. 3 is an exploded perspective view schematically showing a part of the configuration of the track apparatus included in the traveling unit in FIG. 2. As shown in FIG. 3, the above-mentioned track apparatus 10 mainly includes the plurality of track links 1, and connecting pins 7 for connecting the plurality of track links 1 to each other.

Each of the plurality of track links 1 includes rail surface 2a and projection portions 2b as abraded portions. In this embodiment, these abraded portions (rail surface 2a and projection portions 2b) are detachably mounted on track link 1. Hereinafter, such a configuration is described in detail.

Each of the plurality of track links 1 mainly includes a link mounted part 2, a link body 3, and a mounting pin (mounting member) 4. Link mounted part 2 includes abraded portions formed of rail surface 2a and projection portions 2b. Link mounted part 2 further includes a mount element 2c. A through hole 2ca (first pin inserting hole) is formed in mount element 2c.

Link body 3 is formed as a part separate from link mounted part 2. Link body 3 is a part where a track shoe plate portion 3TS and a link portion are integrally formed with each other, and is formed of a single part. Track shoe plate portion 3TS is positioned on an outer surface (ground engaging surface) of endless track apparatus 10. Track shoe plate portion 3TS includes a grouser 3TSg projecting to the outside of track apparatus 10.

Link body 3 includes a recessed portion 3g on an inner surface (non ground-engaging surface) of track apparatus 10. Here, the non ground-engaging surface means a surface disposed on a side opposite to a side where track shoe plate portion 3TS is disposed, that is, the non ground-engaging surface is a surface disposed on a side where track apparatus 10 is brought into contact with drive wheel 21, idler wheel 22, track rollers 24, and carrier rollers 25 as shown in FIG. 2. Recessed portion 3g is provided for fitting link mounted part 2. A through hole 3pa (second pin inserting hole) and a through hole 3pb are formed so as to be communicated with recessed portion 3g. Through hole 3pa and through hole 3pb are separated from each other with recessed portion 3g sandwiched therebetween. Through hole 3*pa* and through hole 3*pb* are formed coaxially with each other.

Link mounted part 2 is fitted in recessed portion 3*g* of link body 3 from a non-contact surface side. Link mounted part 2 is fitted in recessed portion 3*g* of link body 3 from mount element 2*c* side. In a state where link mounted part 2 is fitted in recessed portion 3*g* of link body 3, through hole 2*ca* formed in mount element 2*c* is positioned between through hole 3*pa* and through hole 3*pb* of link body 3. Through hole 3*pa*, through hole 3*pb*, and through hole 2*ca* are respectively arranged coaxially with each other, and are communicated with each other.

A mounting pin 4 is inserted into these through holes 3*pa*, 3*pb*, and 2*ca* in an axial direction of mounting pin 4. Due to such mounting pin 4, link mounted part 2 is mounted and fixed to link body 3 on a side opposite to projection portions 2*b* with respect to the above-mentioned plate portion.

To prevent the removal of mounting pin 4, restriction members (for example, a bolt 5 and a nut 6) are used. The insertion of mounting pin 4 is performed by inserting mounting pin 4 into the inside of through holes 3*pa*, 3*pb*, 2*ca* in an axial direction of mounting pin 4. Restriction members 5, 6 are positioned in the axial direction of mounting pin 4 in a state where restriction members 5, 6 are mounted on link body 3. The axial movement of mounting pin 4 is restricted by restriction members 5, 6. With such a configuration, the removal of mounting pin 4 from through holes 3*pa*, 3*pb*, and 2*ca* in the axial direction can be prevented in a state where mounting pin 4 is made to pass through holes 3*pa*, 3*pb*, and 2*ca*.

By inserting and removing above-mentioned mounting pin 4, link mounted part 2 having the abraded portions (rail surface 2*a* and projection portions 2*b*) can be mounted on and dismounted from link body 3. Further, mounting and dismounting of above-mentioned link mounted part 2 on and from link body 3 can be performed without releasing connection between track links 1 which form track apparatus 10.

Track links 1 are configured to be connected with each other by connecting pin 7. Hereinafter, such a configuration is described in detail.

The plurality of track links 1 are arranged in a row. Two sets each of which is formed of a pair of connecting portions 3*b*, 3*c* are formed on each one of the plurality of track links 1 on one end side of track link 1 in a lateral direction (in a Y direction in the drawing), for example. A through hole 3*ba* is formed in connecting portion 3*b*. A through hole 3*ca* is formed in connecting portion 3*c*. Through hole 3*ba* and through hole 3*ca* formed in the pair of connecting portions 3*b*, 3*c* extend in a longitudinal direction (in an X direction in the drawing) of track link 1, and are arranged coaxially with each other.

For example, two connecting portions 3*d* are formed on each one of the plurality of track links 1 on the other end side of track link 1 in the lateral direction Y. A through hole 3*da* is formed in connecting portion 3*d* respectively. Through holes 3*da* extend in the longitudinal direction X of track link 1.

Connecting portion 3*d* of the other track link 1 is disposed between one pair of connecting portions 3*b*, 3*c* of one track link 1. In a state where connecting portion 3*d* is disposed between the pair of connecting portions 3*b*, 3*c*, through hole 3*da* of connecting portion 3*d* is positioned between respective through holes 3*ba*, 3*ca* of one pair of connecting portions 3*b*, 3*c*. Respective through holes 3*ba*, 3*ca* of connecting portions 3*b*, 3*c* and through hole 3*da* of connecting portion 3*d* are arranged coaxially with each other, and are communicated with each other.

Connecting pin 7 is made to pass through these through holes 3*ba*, 3*ca*, and 3*da* in an axial direction of connecting pin 7. With such a configuration, one track link 1 and the other track link 1 are connected with each other by connecting pin 7. In such a connection state, one track link 1 and the other track link 1 are rotatable relative to each other about connecting pin 7.

To prevent the removal of connecting pin 7, restriction members (for example, a bolt 8 and a nut 9) are used. Restriction members 8, 9 are positioned in the axial direction of connecting pin 7 in a state where restriction members 8, 9 are mounted on link body 3. Due to restricting members 8, 9, the axial movement of connecting pin 7 is restricted. With such a configuration, the removal of connecting pin 7 from through holes 3*ba*, 3*ca*, and 3*da* in the axial direction of the connecting pin 7 can be prevented in a state where connecting pin 7 is made to pass through holes 3*ba*, 3*ca*, and 3*da*.

By sequentially connecting the plurality of track links 1 to each other as described above, track links 1 can be connected to each other in an endless manner.

Further, by removing the above-mentioned restriction members 8, 9 from link body 3 and by removing connecting pin 7 from connecting portions 3*b* to 3*d*, the connection between track links 1 can be released.

Figure 4:
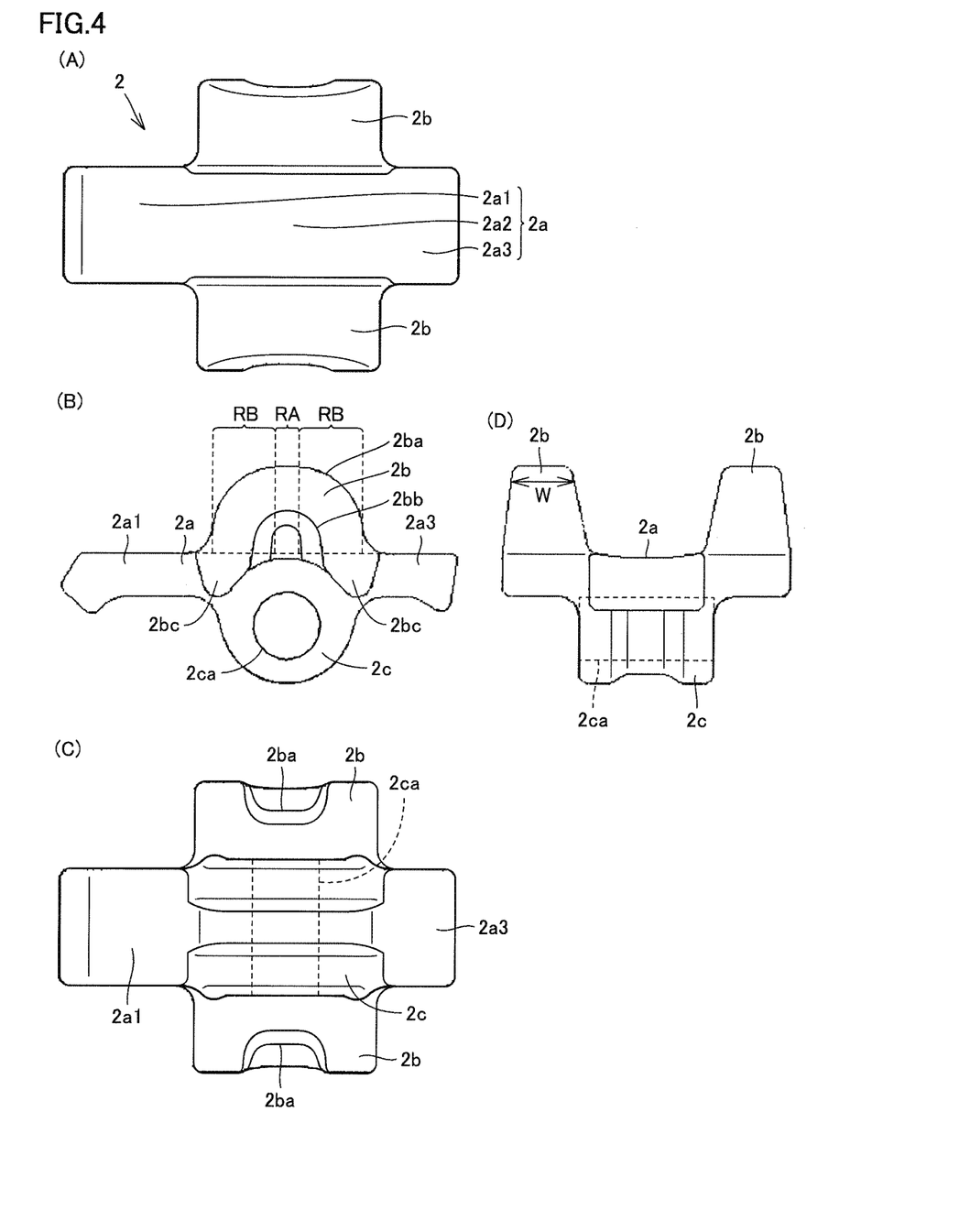
FIG. 4(A) is a plan view.
FIG. 4(B) is a side view.
FIG. 4(C) is a bottom plan view.
FIG. 4(D) is a front view.

Next, with reference to FIG. 4, a configuration of link mounted part 2 which forms track link 1 of this embodiment is described in detail.

FIGS. 4(A) to 4(D) are views showing a configuration of the link mounted part included in the track apparatus in FIG. 3, wherein FIG. 4(A) is a plan view, FIG. 4(B) is a side view, FIG. 4(C) is a bottom plan view, and FIG. 4(D) is a front view. As shown in FIGS. 4(A) to 4(D), link mounted part 2 includes a plate portion having rail surface 2*a*, the pair of projection portions 2*b*, and mount element 2*c*. Plate portion, the pair of projection portions 2*b* and mount element 2*c* are integrally formed with each other thus forming one part. Link mounted part 2 is a forged product formed by forging, for example.

As shown in FIGS. 4(A) and 4(C), the plate portion having rail surface 2*a* includes one end portion 2*a*1, a center portion 2*a*2, and the other end portion 2*a*3. One end portion 2*a*1 is positioned on a one end portion side of center portion 2*a*2. The other end portion 2*a*3 is positioned on the other end side of center portion 2*a*2. An upper surface of one end portion 2*a*1, an upper surface of center portion 2*a*2, and an upper surface of the other end portion 2*a*3 form a coplanar flat surface. The coplanar flat surface forms rail surface 2*a*.

Each one of the pair of projection portions 2*b* is mounted on a side portion of center portion 2*a*2. The pair of projection portions 2*b* sandwiches center portion 2*a*2 therebetween, and bulges sideward from center portion 2*a*2 (rail surface 2*a*).

As shown in FIGS. 4(B) and 4(D), each of the pair of projection portions 2*b* projects toward one side (an upper side in the drawing: a non-contact surface side) from rail surface 2*a*. Mount element 2*c* is mounted on a lower surface of center portion 2*a*2. Mount element 2*c* extends from the lower surface of the plate portion to the other side (a lower side in the drawing: a contact surface side: a side opposite to projection portion 2*b* with reference to the plate portion).

As described above, through hole 2*ca* is formed in mount element 2*c*. Through hole 2*ca* penetrates mount element 2*c* in a direction along which the pair of projection portions 2*b* is arranged. Through hole 2*ca* is a circular columnar hole, and has a single diameter over the whole length in the axial direction.

As shown in FIG. 4(B), as viewed in a side view, an upper surface 2ba of projection portion 2b includes a straight portion RA, and curved portions RB positioned on both sides of straight portion RA. Straight portion RA extends parallel or substantially parallel to rail surface 2a. Curved portion RB has an arcuate shape, for example. Since upper surface 2ba of projection portion 2b has such a shape, projection portions 2b can be meshed with drive wheel 21 with high accuracy.

As viewed in a side view, a lower surface of projection portion 2b has an upwardly projecting curved shape. With such a configuration, projection portion 2b has an upwardly projecting arch shape as viewed in a side view. Since projection portion 2b has an upwardly projecting arch shape, when projection portion 2b is meshed with drive wheel 21, it is possible to prevent the concentration of an external force which acts on projection portion 2b so that the external force can be dispersed.

Further, as viewed in a side view, lower end portions 2bc of projection portion 2b have a downwardly projecting shape. Accordingly, as described later with reference to FIG. 8, lower end portions 2bc of projection portion 2b can be snugly brought into close contact with link body 3. With such a configuration, an external force (tractional load) which acts on projection portion 2b from drive wheel 21 acts on link body 3 thus preventing the external force from acting on mounting pin 4.

Both projection portions 2b and mount element 2c are connected to center portion 2a2. With such a configuration, a weight balance of link mounted part 2 is improved thus enhancing operability by a serviceman.

As shown in FIG. 4(D), as viewed in a front view, a width W of projection portion 2b is gradually decreased as projection portion 2b extends from rail surface 2a side toward a non-contact surface side. In this manner, projection portion 2b has a large width W at a root portion of projection portion 2b and hence, a strength of projection portion 2b can be ensured. Further, projection portion 2b has a small width W at a distal end portion of projection portion 2b and hence, meshing between projection portion 2b and drive wheel 21 can be improved and, at the same time, saving of a material for forming link mounted part 2 can be realized.

Next, with reference to FIGS. 5(A) to 5(C) and FIGS. 6(A) and 6(B), a configuration of link body 3 which forms track link 1 of this embodiment is described in detail.

Figure 5:
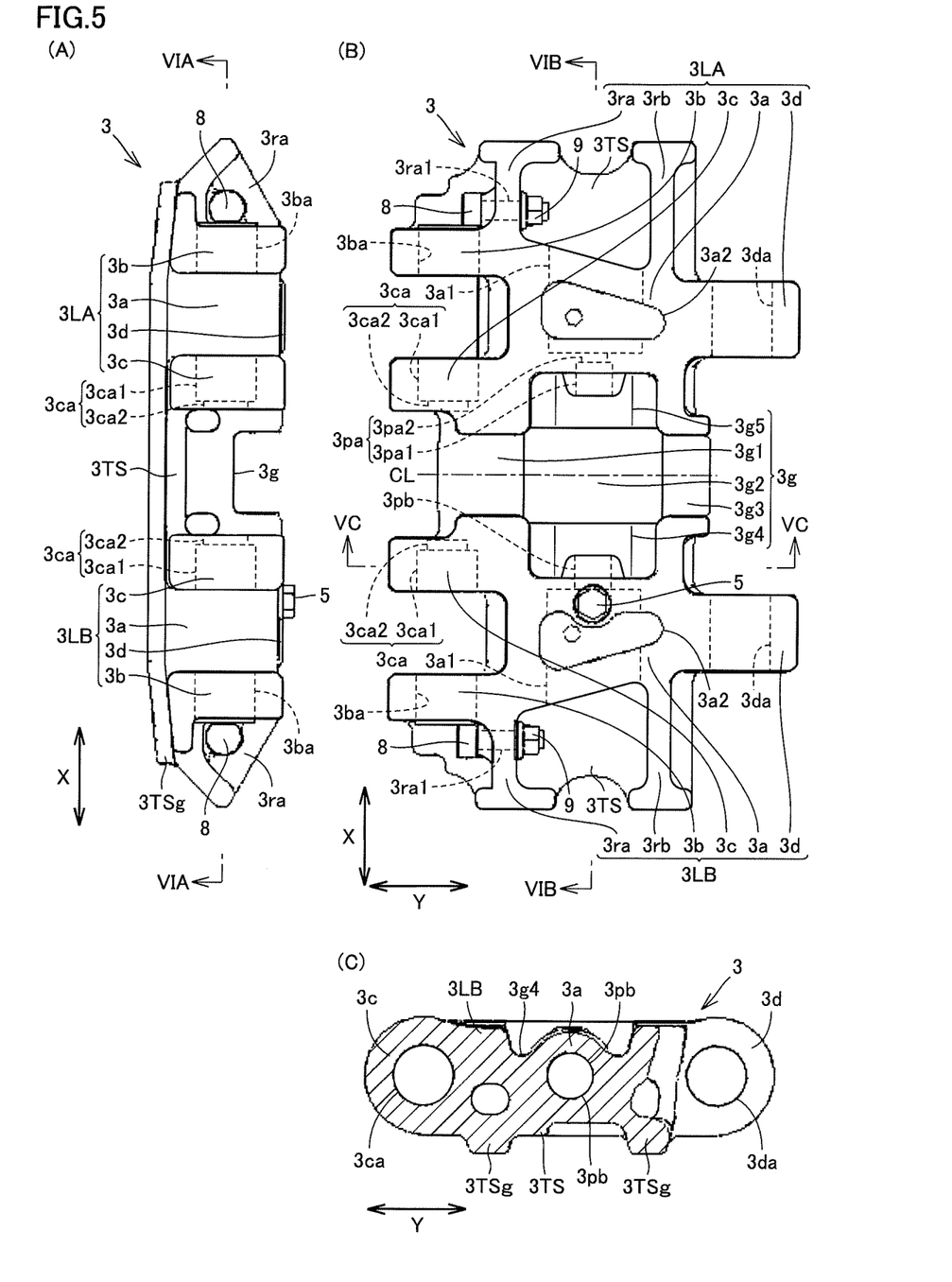
FIG. 5(A) is a front view.
FIG. 5(B) is a plan view.
FIG. 5(C) is a cross-sectional view taken along a line VC-VC in FIG. 5(B) which is a plan view.
Figure 6:
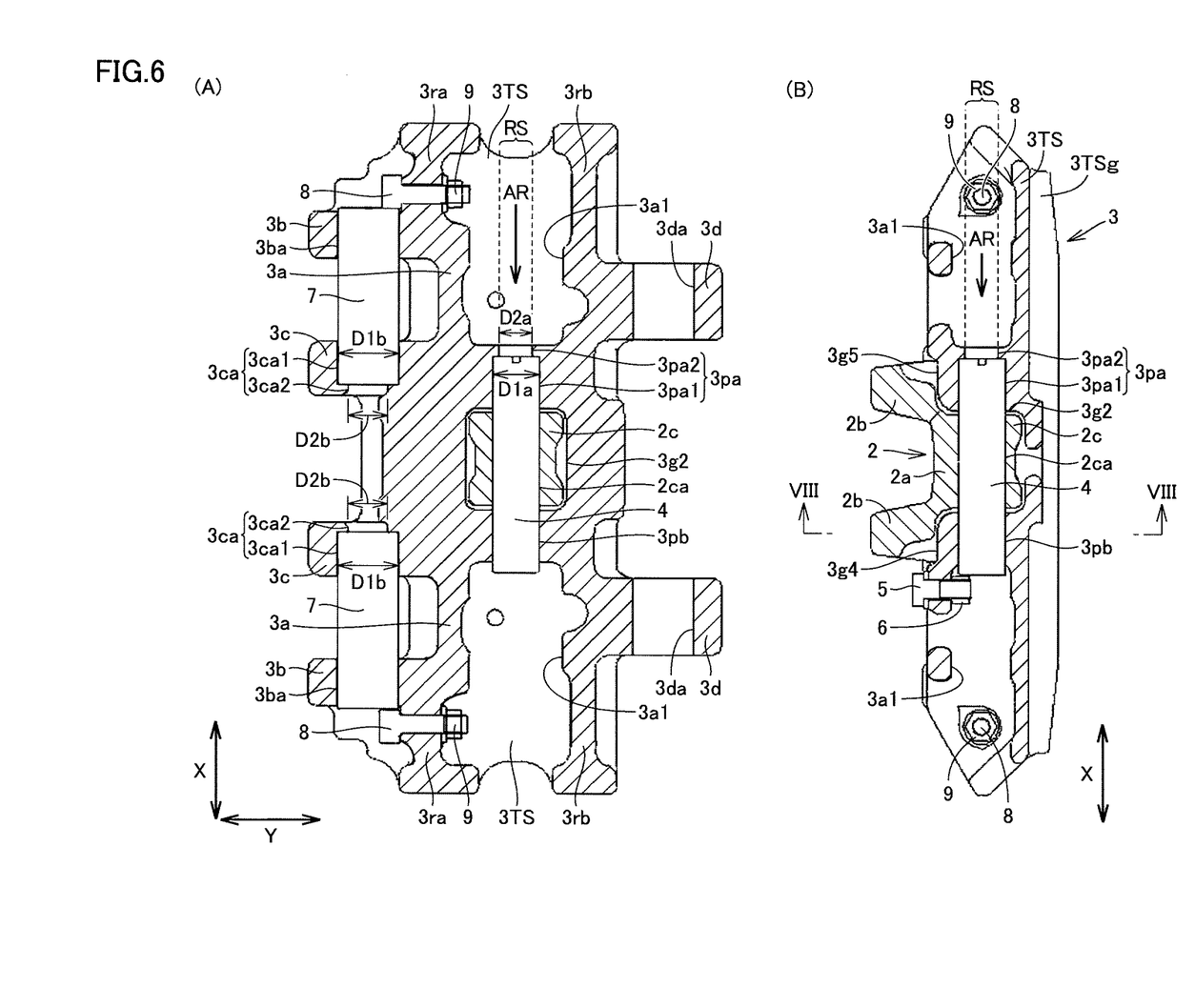
FIG. 6(A) is a cross-sectional view taken along a line VIA-VIA in FIG. 5(A)
FIG. 6(B) is a cross-sectional view taken along a line VIB-VIB in FIG. 5(B).

FIGS. 5(A) to 5(C) are views showing a configuration of the link body included in the track apparatus in FIG. 3, wherein FIG. 5(A) is a front view, FIG. 5(B) is a plan view, and FIG. 5(C) is a cross-sectional view taken along a line VC-VC in FIG. 5(B) which is a plan view. FIGS. 6(A) and 6(B) are views showing a configuration of the link body included in the track apparatus in FIG. 3, wherein FIG. 6(A) is a cross-sectional view taken along a line VIA-VIA in FIG. 5(A), and FIG. 6(B) is a cross-sectional view taken along a line VIB-VIB in FIG. 5(B).

As shown in FIGS. 5(A) to 5(C), link body 3 mainly includes: a recessed portion forming portion on which recessed portion 3g is formed; link portions 3LA, 3LB; and track shoe plate portion 3TS. The recessed portion forming portion, link portions 3LA, 3LB, and track shoe plate portion 3TS are integrally formed with each other thus forming a single part. Link body 3 is a casting produced by foundry, for example.

As shown in FIG. 5(A), track shoe plate portion 3TS is positioned on a ground engaging surface side of link body 3. Track shoe plate portion 3TS includes grousers 3TSg which project outward (from a ground engaging surface side) of track apparatus 10. A plurality of grousers 3TSg (for example, two grousers) are formed on one link body 3. Each of the plurality of grousers 3TSg extends along longitudinal direction X of link body 3.

The recessed portion forming portion on which recessed portion 3g is formed and link portions 3LA, 3LB are positioned on a non ground-engaging surface side of track shoe plate portion 3TS. Link portion 3LA is arranged on one end side of the recessed portion forming portion, and link portion 3LB is arranged on the other end side of the recessed portion forming portion. With such a configuration, the recessed portion forming portion is arranged between link portion 3LA and link portion 3LB.

As shown in FIG. 5(B), recessed portion 3g formed on the recessed portion forming portion is formed of recessed portions 3g1 to 3g5. Recessed portion 3g2 is formed on a center portion of a non ground-engaging surface of link body 3 with a large depth. Recessed portion 3g2 is a portion for accommodating mount element 2c and center portion 2a2 of link mounted part 2 shown in FIG. 4(A) to FIG. 4(D).

Recessed portion 3g1 is arranged on one end side of recessed portion 3g2 in the lateral direction Y of link body 3. Recessed portion 3g1 is formed with a depth shallower than a depth of recessed portion 3g2. Recessed portion 3g1 is a part for accommodating one end portion 2a1 of link mounted part 2 shown in FIGS. 4(A) to 4(D).

Recessed portion 3g3 is arranged on the other end side of recessed portion 3g2 in lateral direction Y of link body 3. Recessed portion 3g3 is formed with a depth shallower than a depth of recessed portion 3g2. Recessed portion 3g3 is a part for accommodating the other end portion 2a3 of link mounted part 2 shown in FIGS. 4(A) to 4(D).

Recessed portion 3g4 is arranged on one end side of recessed portion 3g2 in longitudinal direction X of link body 3. Recessed portion 3g4 is formed with a depth shallower than the depth of recessed portion 3g2. Recessed portion 3g4 is a part for accommodating a lower portion which forms one of the pair of projection portions 2b of link mounted part 2 shown in FIGS. 4(A) to 4(D).

Recessed portion 3g5 is arranged on the other end side of recessed portion 3g2 in longitudinal direction X of link body 3. Recessed portion 3g5 is formed with a depth shallower than the depth of recessed portion 3g2. Recessed portion 3g5 is a part for accommodating a lower portion which forms the other of the pair of projection portions 2b of link mounted part 2 shown in FIGS. 4(A) to 4(D).

As shown in FIG. 5(B), link portion 3LA includes base portion 3a, connecting portions 3b to 3d, and rim portions 3ra, 3rb. Base portion 3a extends toward a non contact surface side from track shoe plate portion 3TS. On base portion 3a, indented portion 3a2 which is indented from a non contact surface to a contact surface side is formed.

Through hole 3pa which makes indented portion 3a2 and recessed portion 3g communicate with each other is formed in base portion 3a. Through hole 3pa has a large diameter portion 3pa1 (first hole portion) and small diameter portion 3pa2 (second hole portion). Large diameter portion 3pa1 and small diameter portion 3pa2 are respectively formed of a circular columnar hole, for example. Large diameter portion 3pa1 and small diameter portion 3pa2 are communicated with each other, and are arranged coaxially with each other. Large diameter portion 3pa1 is positioned closer to a recessed portion 3g side than small diameter portion 3pa2.

Further, through hole 3a1 is formed in base portion 3a. Through hole 3a1 is positioned on a side opposite to through hole 3pa with reference to indented portion 3a2 in longitudinal direction X of link body 3. Through hole 3a1 extends in longitudinal direction X of link body 3, and is communicated with indented portion 3a2. Through hole 3pa is exposed from a side of link body 3 through through hole 3a1 and indented portion 3a2.

Connecting portions 3b and connecting portions 3c are respectively connected to base portion 3a. Connecting portions 3b and connecting portions 3c are respectively configured to project toward one side in lateral direction Y of link body 3 from base portion 3a. Through hole 3ba is formed in connecting portion 3b, and through hole 3ca is formed in connecting portion 3c. Through hole 3ba is a circular columnar hole, for example. Through hole 3ba and through hole 3ca are arranged coaxially with each other.

Through hole 3ba is a circular columnar hole. Through hole 3ba penetrates connecting portion 3b in longitudinal direction X of link body 3 while maintaining a single diameter.

Through hole 3ca penetrates connecting portion 3c in longitudinal direction X of link body 3. Through hole 3ca has a large diameter portion 3ca1 and a small diameter portion 3ca2. Large diameter portion 3ca1 and small diameter portion 3ca2 are respectively formed of a circular columnar hole, for example. Large diameter portion 3ca1 and small diameter portion 3ca2 are communicated with each other, and are arranged coaxially with each other. Small diameter portion 3ca2 is positioned closer to a recessed portion 3g side than large diameter portion 3ca1.

Connecting portions 3d are connected to base portion 3a. Connecting portions 3d project toward the other side from base portion 3a in lateral direction Y of link body 3. Connecting portions 3d project toward a side opposite to connecting portions 3b, 3c with reference to base portion 3a in lateral direction Y of link body 3. Connecting portion 3d is positioned at a side opposite to a region sandwiched between connecting portion 3b and connecting portion 3c with reference to base portion 3a in lateral direction Y of link body 3. Through hole 3da is formed in connecting portion 3d. Through hole 3da is formed of a circular columnar hole, for example. Through hole 3da penetrates connecting portion 3d in longitudinal direction X of link body 3 while maintaining a single diameter.

Rim portions 3ra and rim portions 3rb are respectively connected to base portion 3a. Rim portions 3ra and rim portions 3rb respectively project toward a side opposite to recessed portion 3g in longitudinal direction X of link body 3 with reference to base portion 3a. Rim portion 3ra and rim portion 3rb are arranged so as to sandwich through hole 3a1 therebetween in lateral direction Y of link body 3.

A through hole 3ra1 is formed in rim portion 3ra. Through hole 3ra1 penetrates rim portion 3ra in lateral direction Y of link body 3. Restriction members (bolt 8, nut 9) are mounted in through hole 3ra1. Bolt 8 is made to pass through through hole 3ra1, and nut 9 is threadedly engaged with bolt 8. With such a configuration, bolt 8 is fixed to rim portion 3ra.

Link portion 3LB has a configuration which is substantially in line symmetry with link portion 3LA with respect to a center line CL in longitudinal direction X of link body 3. The configuration of link portion 3LB differs from the configuration of link portion 3LA with respect to a shape of through hole 3pb and the presence of restriction members (bolt 5, nut 6).

Through hole 3pb is formed in base portion 3a so as to make indented portion 3a2 formed on link portion 3LB and recessed portion 3g communicate with each other. Through hole 3pb is formed of a circular columnar hole, for example. Through hole 3pb penetrates base portion 3a in longitudinal direction X of link body 3 while maintaining a single diameter.

A through hole 3a3 (FIG. 3) is formed in a portion of base portion 3a of link portion 3LB positioned between recessed portion 3g and indented portion 3a2. The restriction members (bolt 5, nut 6) are mounted on through hole 3a3. Bolt 5 is made to pass through through hole 3a3, and nut 6 is threadedly engaged with bolt 5. With such a configuration, bolt 5 is fixed to base portion 3a.

A configuration of link portion 3LB is substantially equal to the corresponding configuration of link portion 3LA described above except for the above-mentioned configuration. Accordingly, among constitutional elements of link portion 3LB, constitutional elements identical with corresponding constitutional elements of link portion 3LA are given the same symbols, and the description of these constitutional elements is not repeated.

As shown in FIG. 5(C), track shoe plate portion 3TS having grousers 3TSg is integrally formed with link portions 3LA, 3LB. As viewed in a side view, through holes 3ca, 3da, 3pb are arranged on a straight line extending along lateral direction Y of link body 3. In the same manner, through holes 3ca, 3da, 3pa are also arranged on a straight line extending along the lateral direction of link body 3.

As shown in FIGS. 6(A) and 6(B), each of through hole 3pb, large diameter portion 3pa1 of through hole 3pa and through hole 2ca of mount element 2c has a diameter which is set larger than or equal to a diameter D1a of mounting pin 4. On the other hand, small diameter portion 3pa2 of through hole 3pa has a diameter D2a which is set smaller than diameter D1a of mounting pin 4.

With such a configuration, in inserting mounting pin 4 into through hole 3pb, through hole 2ca and large diameter portion 3pa1, the insertion of mounting pin 4 can be stopped at a boundary between large diameter portion 3pa1 and small diameter portion 3pa2. Accordingly, positioning of mounting pin 4 at the time of inserting mounting pin 4 can be performed easily.

No part of link body 3 is found in a side region RS disposed on a side of small diameter portion 3pa2 in longitudinal direction X of link body 3. Accordingly, one end surface of mounting pin 4 inserted into respective holes 3pb, 2ca, 3pa1 is exposed from a side of link body 3 through small diameter portion 3pa2. With such a configuration, one end surface of mounting pin 4 can be pushed through small diameter portion 3pa2 from a direction indicated by an arrow AR in the drawing. Due to such a pushing force, mounting pin 4 can be removed from through holes 3pb, 2ca and 3pa1.

On the other end surface side of mounting pin 4 in an axial direction of mounting pin 4 inserted into respective holes 3pb, 2ca and 3pa1, the restriction members (bolt 5, nut 6) are positioned. Restriction members 5, 6 are positioned in the axial direction of mounting pin 4 and hence, the removal of mounting pin 4 from respective holes 3pb, 2ca and 3pa1 can be prevented. Further, by removing restriction members 5, 6 from link body 3, mounting pin 4 can be removed from respective holes 3pb, 2ca, and 3pa1.

In base portion 3a, through hole 3ba, through hole 3da and large diameter portion 3ca1 of through hole 3ca respectively have a diameter which is set larger than or equal to a diameter D1b of connecting pin 7. On the other hand, small diameter portion 3ca2 of through hole 3ca has a diameter D2b which is set smaller than diameter D1b of connecting pin 7.

With such a configuration, in inserting connecting pin 7 into through hole 3ba, through hole 3da and through hole 3ca, the insertion of connecting pin 7 can be stopped at a boundary between large diameter portion 3ca1 and small diameter portion 3ca2. Accordingly, positioning of connecting pin 7 at the time of inserting connecting pin 7 can be performed easily.

No part of link body 3 is found in side region RS disposed on a side of small diameter portion 3pa2 in longitudinal direction X of link body 3. Accordingly, one end surface of connecting pin 7 inserted into respective holes 3ba, 3da, and 3ca is exposed from link body 3 through small diameter portion 3ca2. With such a configuration, one end surface of connecting pin 7 can be pushed through small diameter portion 3ca2. Due to such a pushing force, connecting pin 7 can be removed from through holes 3ba, 3da, and 3ca.

On the other end surface side of connecting pin 7 inserted into respective holes 3ba, 3da, and 3ca, the restriction members (bolt 8, nut 9) are positioned. Restriction members 8, 9 are positioned in the axial direction of connecting pin 7 and hence, the removal of connecting pin 7 from respective holes 3ba, 3da, and 3ca can be prevented. Further, by removing restriction members 8, 9 from link body 3, connecting pin 7 can be removed from respective holes 3ba, 3da, and 3ca.

Figure 7:
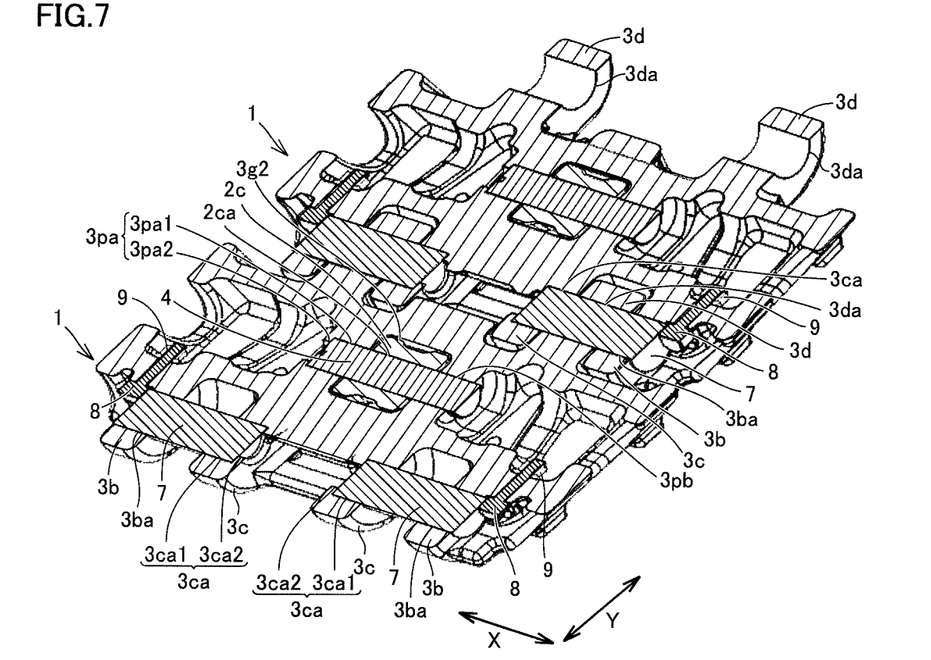
FIG. 7 is a cross-sectional perspective view taken along a line VIA-VIA in FIG. 5(A) showing a configuration where two track links are connected to each other.
Figure 8:
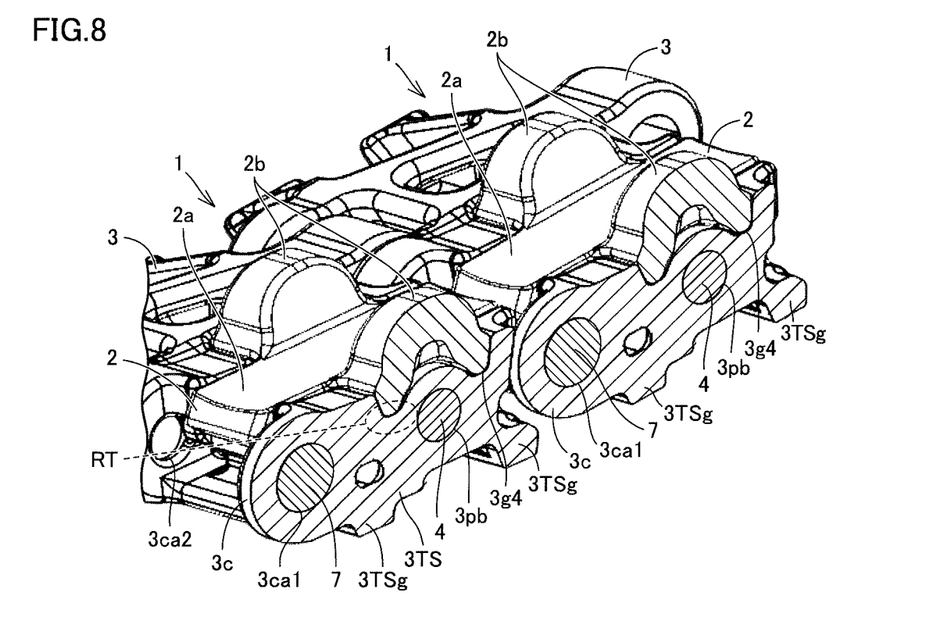
FIG. 8 is a cross-sectional perspective view taken along a line VIII-VIII in FIG. 6(B) showing a configuration where two track links are connected to each other.

Next, with reference to FIG. 7 and FIG. 8, a connecting state between track links 1 according to this embodiment and a mounting state of mounting link mounted part 2 to link body 3 are described.

FIG. 7 is a cross-sectional perspective view taken along a line VIA-VIA in FIG. 5(A) showing a configuration where two track links are connected to each other. FIG. 8 is a cross-sectional perspective view taken along a line VIII-VIII in FIG. 6(B) showing a configuration where two track links are connected to each other.

As shown in FIG. 7, connecting portion 3d of the other track link 1 is inserted between the pair of connecting portions 3b, 3c of one track link 1. In such a state, through hole 3ba of connecting portion 3b, through hole 3ca of connecting portion 3c and through hole 3da of connecting portion 3d are arranged coaxially with each other. Connecting pin 7 is inserted into through holes 3ba, 3ca, and 3da arranged coaxially with each other. With such a configuration, one track link 1 and the other track link 1 are connected to each other.

Mount element 2c of link mounted part 2 is inserted into recessed portion 3g2 of link body 3. In such a state, through holes 3pa, 3pb of link body 3 and through hole 2ca of mount element 2c are arranged coaxially with each other. Mounting pin 4 is inserted into through holes 3pa, 3pb, and 2ca arranged coaxially with each other. With such a configuration, link mounted part 2 is mounted on link body 3.

As shown in FIG. 8, in a state where link mounted part 2 is mounted on link body 3, link mounted part 2 is brought into contact with link body 3. For example, as indicated by region RT in the drawing, a lower surface of a lower end portion of projection portion 2b of link mounted part 2 is brought into contact with link body 3. With such a configuration, an external force (for example, a tractional load) which acts on link mounted part 2 when track apparatus 10 is rotatably driven acts on link body 3 and does not act on mounting pin 4. A load which acts on mounting pin 4 can be reduced in this manner and hence, durability of the track link can be enhanced.

Respective bottom surfaces of recessed portions 3g1, 3g2, 3g3 shown in FIG. 5(B) are brought into contact with link mounted part 2 and hence, the bottom surfaces can receive a radial load generated when track apparatus 10 is rotatably driven. The respective side surfaces of recessed portions 3g1 to 3g5 are also brought into contact with link mounted part 2 and hence, the respective side surfaces can receive a thrust load generated when track apparatus 10 is rotatably driven.

Next, the advantageous effects acquired by the track link of this embodiment are described.

According to track link 1 of this embodiment, as shown in FIG. 3, link mounted part 2 is mounted on link body 3 by mounting pin 4. By removing mounting pin 4 from link mounted part 2 and link body 3, link mounted part 2 can be removed from link body 3. Accordingly, even when projection portions 2b and rail surface 2a of link mounted part 2 are abraded, maintenance of the abraded portions (projection portions 2b and rail surface 2a) can be performed by removing link mounted part 2 from link body 3 without releasing joints of track links 1.

As shown in FIG. 2, two projection portions 2b are arranged on both sides of the plate portion while sandwiching the plate portion including rail surface 2a therebetween. With such a configuration, it is possible to make both two projection portions 2b which sandwich rail surface 2a therebetween mesh with drive wheel 21. Accordingly, it is possible to realize stable meshing between two projection portions 2b and drive wheel 21.

As shown in FIG. 7, mounting pin 4 is inserted into through holes 3pa, 3pb, and 2ca. By inserting or removing mounting pin 4 into or from through holes 3pa, 3pb, 2ca, link mounted part 2 can be detachably mounted on link body 3.

In the above-mentioned embodiment, the description has been made with respect to the configuration where two projection portions 2b are provided for one rail surface 2a as shown in FIG. 3 and the like. However, track link 1 to which the present invention is applied may be configured such that one projection portion 2b is provided for one rail surface 2a.

In the above-mentioned embodiment, the description has been made with respect to a case where mounting member 4 for mounting link mounted part 2 on link body 3 is mounting pin 4. However, mounting member 4 is not limited to mounting pin 4. Mounting member 4 may be a bolt or the like. That is, mounting member 4 may be formed of any member provided that link mounted part 2 can be mounted on or dismounted from link body 3.

It should be construed that the embodiment disclosed herein is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

REFERENCE SIGNS LIST

1: track link, 2: link mounted part, 2a: rail surface, 2a1: one end portion, 2a2: center portion, 2a3: the other end portion, 2b: projection portion, 2ba: upper surface, 2bb: lower surface, 2bc: lower end portion, 2c: mount element, 2ca, 3a1, 3a3, 3ba, 3ca, 3da, 3pa, 3pb, 3ra1: through hole, 3: link body, 3LA, 3LB: link portion, 3TS: track shoe plate portion, 3TSg: grouser, 3a: base portion, 3a2: indented portion, 3g, 21ea: recessed portion, 3b, 3c, 3d: connecting portion, 3ca1, 3pa1: large diameter portion, 3ca2, 3pa2: small diameter portion, 3g1 to 3g5: recessed portion, 3ra, 3rb: rim portion, 4: mounting pin, 5, 8: bolt, 6, 9: nut, 7: connecting pin, 10: track apparatus, 20: traveling unit, 21:

drive wheel, 21da: rolling surface, 22: idler wheel, 23: track frame, 24: track roller, 25: carrier roller, 26: revolving apparatus, 30: revolving unit, 31: operator's cab, 32: engine compartment, 33: counter weight, 34: access system, 40: work implement, 41: boom, 42: dipper stick, 43: bucket, 50: hydraulic excavator

The invention claimed is:

1. A track link comprising:
    a link body which is an integral body formed of a track shoe plate portion and a link portion;
    a link mounted part which is formed as a part separate from the link body, and includes a plate portion having a rail surface, a projection which is integrally formed with the plate portion and projects from the rail surface, and a mount element which is mounted on the plate portion, extends toward a side opposite to the projection with respect to the plate portion, and has a mounting member hole; and
    a mounting member which mounts the link mounted part on the link body on a side opposite to the projection with respect to the plate portion,
    wherein the projection and the mounting member are disposed at a same position in a longitudinal direction of the plate portion,
    wherein the projection includes a first projection portion and a second projection portion which are respectively integrally formed with the plate portion and project from the rail surface,
    wherein the first projection portion and the second projection portion are arranged on both sides of the plate portion with the plate portion sandwiched therebetween, and
    wherein the mounting member hole penetrates the mount element in a direction along which the first projection portion and the second projection portion are arranged.

2. The track link according to claim 1, wherein the mounting member is a mounting pin.

3. The track link according to claim 2, wherein the mounting member hole is a first pin insertion hole formed in the link mounted part, and a second pin insertion hole is formed in the link body, and
    the mounting pin is inserted into both the first pin insertion hole and the second pin insertion hole.

4. The track link according to claim 3, wherein the second pin insertion hole includes a first hole portion positioned in one end portion side and a second hole portion positioned on the other end portion side,
    the first hole portion having a diameter larger than or equal to a diameter of the mounting pin, and the second hole portion having a diameter smaller than the diameter of the mounting pin.

5. The track link according to claim 4, wherein an end surface of the mounting pin is exposed from the link body through the second hole portion.

6. The track link according to claim 2, further comprising a restriction member which is mounted on the link body, and restricts the movement of the mounting pin in an axial direction.

7. The track link according to claim 1, wherein the link mounted part is brought into contact with the link body.

8. A link mounted part comprising:
    a plate portion having a rail surface;
    a projection which is integrally formed with the plate portion, and projects from the rail surface; and
    a mount element which is mounted on the plate portion, extends toward a side opposite to the projection with respect to the plate portion, and has a mounting member hole,
    wherein the projection and the mounting member hole are disposed at a same position in a longitudinal direction of the plate portion,
    wherein the projection includes a first projection portion and a second projection portion which are integrally formed with the plate portion and project from the rail surface,
    wherein the first projection portion and the second projection portion are arranged on both sides of the plate portion with the plate portion sandwiched therebetween, and
    wherein the mounting member hole penetrates the mount element in a direction along which the first projection portion and the second projection portion are arranged.

9. The link mounted part according to claim 8, wherein the mounting member hole is a pin insertion hole.

* * * * *